(12) United States Patent
Cheriaux (10) Patent No.: US 8,774,240 B2
(45) Date of Patent: Jul. 8, 2014

(54) FREQUENCY-DRIFT AMPLIFICATION DEVICE FOR A PULSED LASER

(75) Inventor: Gilles Cheriaux, Fresnes (FR)

(73) Assignee: Ecole Polytechnique, Palaiseau (FR)

(*) Notice: Subject to any disclaimer, the term of this patent is extended or adjusted under 35 U.S.C. 154(b) by 0 days.

(21) Appl. No.: 13/876,184

(22) PCT Filed: Sep. 30, 2011

(86) PCT No.: PCT/FR2011/052288
§ 371 (c)(1),
(2), (4) Date: Apr. 26, 2013

(87) PCT Pub. No.: WO2012/042186
PCT Pub. Date: Apr. 5, 2012

(65) Prior Publication Data
US 2013/0223460 A1    Aug. 29, 2013

(30) Foreign Application Priority Data

Sep. 30, 2010  (FR) ...................... 10 57933

(51) Int. Cl.
*H01S 3/10* (2006.01)
*H01S 3/00* (2006.01)
*H01S 3/23* (2006.01)

(52) U.S. Cl.
CPC ............. *H01S 3/10* (2013.01); *H01S 3/0057* (2013.01); *H01S 3/2316* (2013.01)
USPC ............. 372/25; 372/30; 372/102; 359/333; 359/337; 359/337.5; 359/566

(58) Field of Classification Search
USPC .......................................... 372/25
See application file for complete search history.

(56) References Cited

U.S. PATENT DOCUMENTS

| 5,847,863 | A   |     | 12/1998 | Galvanauskas et al. |
|-----------|-----|-----|---------|---------------------|
| 5,862,287 | A   | *   | 1/1999  | Stock et al. ................... 385/123 |
| 6,801,551 | B1  | *   | 10/2004 | Delfyett et al. ................. 372/23 |
| 2003/0156605 | A1 | * | 8/2003 | Richardson et al. ............ 372/25 |
| 2005/0226278 | A1 | * | 10/2005 | Gu et al. ........................... 372/6 |

(Continued)

FOREIGN PATENT DOCUMENTS

WO    WO 2012/017179 A2    2/2012

OTHER PUBLICATIONS

Dawson, Jay W. et al: "High-Energy, Short-Pulse Fiber Injection Lasers at Lawrence Livermore National Laboratory", *IEEE J. of Selected Topics in Quantum Electronics*, vol. 15, No. 1, (Jan./Feb. 2009) pp. 207-219.

(Continued)

*Primary Examiner* — Xinning Niu
(74) *Attorney, Agent, or Firm* — Leydig, Voit & Mayer, Ltd.

(57) ABSTRACT

A frequency-drift amplification device for a pulsed laser, including: a stretcher for time-stretching an incident laser pulse; at least one amplifying medium for amplifying the laser pulse; a main compressor for time-compressing the laser pulse to a desired duration for an output pulse of the amplification device; and at least one adjustment compressor between the stretcher and the main compressor, and in which the laser pulse undergoes four diffractions on diffraction gratings to time-compress the stretched laser pulse to a duration that is greater than the desired duration for the output pulse of the amplification device.

12 Claims, 4 Drawing Sheets

(56) References Cited

U.S. PATENT DOCUMENTS

2006/0050750 A1* 3/2006 Barty .............................. 372/25
2007/0014317 A1   1/2007 Liu et al.
2008/0298401 A1* 12/2008 Faure et al. ..................... 372/18

OTHER PUBLICATIONS

Palfrey, S. L. et al: "Generation of 16-fsec frequency-tunable pulses by optical pulse compression", *Optics Letters*, vol. 10, No. 11, (Nov. 1985) pp. 562-564.

Canova, Lorenzo et al: "Carrier-envelope phase stabilization and control using a transmission grating compressor and an AOPDF", *Optics Letters*, vol. 34, No. 9, (May 1, 2009) pp. 1333-1335.

Cheriaux, G. et al: Compression of terawatt-level pulses in the air, *Conference on Lasers and Electro-Optics (CLEO 2000), Technical Digest postconference edition*, TOPS vol. 39 (IEEE Cat. No. 00CH37088) (May 7-12, 2000) p. 541).

European Patent Office, International Search Report in International Patent Application No. PCT/FR2011/052288 (Jan. 9, 2012).

* cited by examiner

FREQUENCY-DRIFT AMPLIFICATION DEVICE FOR A PULSED LASER

FIELD OF THE INVENTION

The present invention relates to an amplification device for an intense pulsed laser, using the so-called chirped pulse amplification technology.

This technology is used to produce very short-lasting laser pulses, for example approximately several femtoseconds, with a very high peak power.

BACKGROUND OF THE INVENTION

Pulsed lasers make it possible to achieve high instantaneous powers for a very short duration of approximately several picoseconds ($10^{-12}$ s) or several femtoseconds ($10^{-15}$ s). In these lasers, an ultra-short laser pulse is generated in an oscillator before being amplified in amplifying mediums. The laser pulse initially produced, even with low energy, creates a high instantaneous power, since the energy of the pulse is delivered in an extremely short time.

To make it possible to increase the energy of the laser pulse without the very high instantaneous power creating nonlinear effects, it has been considered to time-stretch the pulse before it is amplified, then to recompress it after amplification. The instantaneous powers used in amplifying mediums can thus be decreased. This method, called "frequency-drift amplification" (frequently called CPA, for "Chirped Pulse Amplification"), makes it possible to increase the length of a pulse by a factor of approximately $10^3$ to $10^5$, then to recompress it so that it regains a duration close to its initial duration.

This CPA method, described in the article by D. Strickland and G. Mourou, "Compression of amplified chirped optical pulses" (Opt. Commun. 56, 219-221-1985), uses a spectral decomposition of the pulse, making it possible to impose a path with a length different from the various wavelengths to time-shift them.

Figure 1:
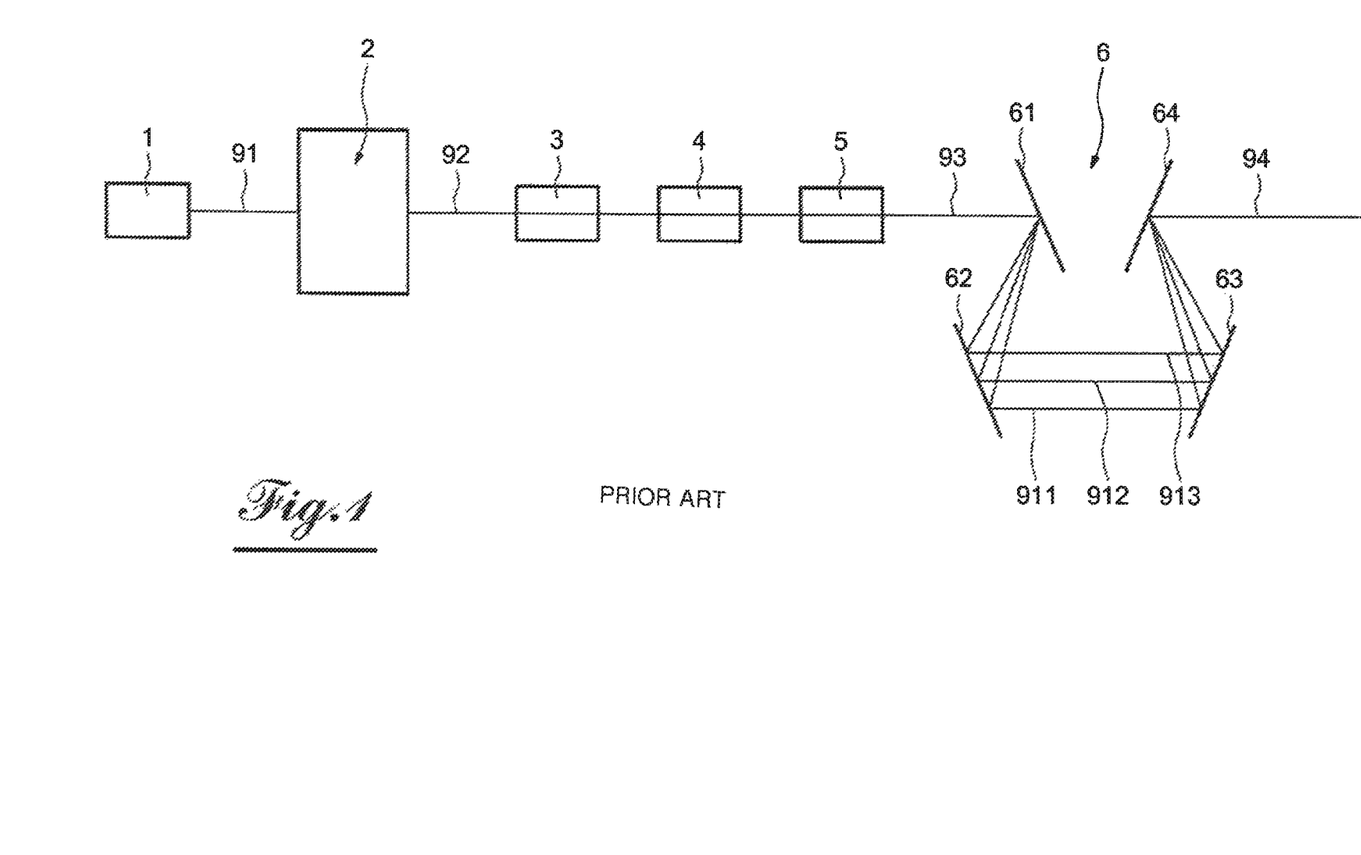
FIG. 1, already described above, is a simplified diagram of a chirped pulse amplification device for laser pulse, according to the prior art.

FIG. 1 diagrammatically shows the amplification of the laser pulse using this chirped pulse amplification method.

An oscillator 1 emits a laser pulse 91, called input pulse, with a very short duration $\Delta T$, for example 10 femtoseconds, and relatively low energy E, for example approximately several nanojoules. This input pulse 91 passes through a stretcher 2 that distributes its various spectral components over time as a function of their wavelength.

Several methods can be used to produce the stretcher 2.

One commonly used stretcher 2 implements diffraction gratings reflecting the incident light rays with different orientation depending on the wavelength. The structure of such a stretcher is in particular described in the article by O. E. Martinez, "3000 times grating compressor with positive group velocity dispersion: application to fiber compensation in 1.3-1.6 µm region" (IEEE Journal of quantum Electronics, Vol. qe-23, p. 59, 1987).

The different spectral components forming the input pulse 91 do not travel the same path in the stretcher 2. Depending on the construction of said stretcher 2, the components with shorter wavelengths must travel a longer path, or on the contrary a shorter path than the components with a larger wavelength. This difference in the length of the path causes a time-shift of the spectral components as a function of their wavelength in the pulse 92, which is called a stretched pulse.

This stretched pulse 92 consequently has a greater duration than the duration $\Delta T$ of the input pulse 91, which may for example be approximately $10^5$ $\Delta T$. This greater duration causes a very significant decrease in the instantaneous power of this pulse 92 relative to that of the input pulse 91, which allows it to be amplified under better conditions.

Another method that can be used to stretch laser pulses is the propagation of those pulses in optical fibers over long distances. The group speed dispersion of the spectral components of the pulse in the material at the core of the fiber makes it possible to obtain the desired time-elongation.

Still another known stretching method consists of a Bragg diffraction grating made from a photosensitive material, whereof the pitch is not constant with respect to the thickness. The different spectral components of the laser pulse are then reflected at different depths, which creates a delay for certain spectral components relative to others and thereby stretches the pulse. Such a method is in particular described in the article by Vadim Smirnov, Emilie Flecher, Leonid Glebov, Kai-Hsiu Liao, and Almantas Galvanauskas, "Chirped bulk Bragg gratings in PTR glass for ultrashort pulse stretching and compression" (Proceedings of Solid State and Diode Lasers Technical Review. Los Angeles 2005, SS2-1.).

The stretched pulse 92 leaving the stretcher 2 is then amplified using traditional amplifying mediums, which increase its power. As an example, three amplifying mediums are shown in FIG. 1.

The first amplifying medium 3, called "high gain amplifier," increases the power of the stretched pulse 92 until giving it an energy of approximately $10^6$ times the energy E of the incident pulse 91, for example several millijoules. The second amplifying medium 4 and the third amplifying medium 5 also increase the power of the laser pulse such that the amplified stretched pulse 93 has an energy of approximately $10^{10}$ times the energy E of the input pulse 91, for example 25 joules.

Although the pulse has a relatively significant energy, its duration is relatively long, which means that its peak power is low enough to avoid non-linear effects in the amplifying mediums 3, 4 and 5.

The amplifying medium used is most often a stimulated emission amplifying medium, for example such as a titanium-doped sapphire crystal. According to one possible alternative, the amplification of the laser pulse can be done using the method typically called "Optical Parametric Chirped Pulse Amplification," which combines laser pulse parametric amplification with the chirped pulse amplification technique. This amplification method is in particular described in the article by A. Dubietis et al. "Powerful femtosecond pulse generation by chirped and stretched pulse parametric amplification in DBO Crystal" (Opt. Commun. 88, 433 (1992)).

Amplifiers using stimulated emission amplification or parametric amplification are indifferently designated as "amplifying mediums" in the following of this patent application.

The return of the pulse to a very short duration, close to the duration $\Delta T$ of the input pulse, is done in an optical device called a compressor 6, comprising four diffraction gratings 61, 62, 63 and 64 reflecting the incident light rays with a different orientation depending on the wavelength.

Thus, a first grating 61 spectrally disperses the stretched pulse 93. As an illustration, the three rays 911, 912 and 913, corresponding to two extreme wavelengths of the pulse 910 and one middle wavelength, are shown in FIG. 1.

The second grating 62 returns the spectral components in parallel, in particular 911, 912 and 913, making up the laser pulse, which are thus spatially spread out. The third grating 63 makes it possible to bring these four spectral components together in a same point of the fourth grating 64, which returns all of the spectral components, in particular 911, 912 and 913, in the same direction, to form a new laser pulse 94.

The different spectral components, in particular 911, 912 and 913, forming the input pulse 91 do not travel the same path in the compressor 6. More specifically, the compressor 6 is built such that the spectral components that have a longer path in the stretcher 2 have a shorter path in the compressor 6. This length difference in the path causes a time shift of the spectral components as a function of their wavelength, opposite to the shift generated by the stretcher 2.

Thus, the spectral components that were time-delayed in the pulse 92 or 93 make up their delay, such that all of the spectral components are temporally gathered in an output pulse 94 having a duration similar to the duration ΔT of the input pulse 91, for example 20 femtoseconds, and a very high peak power, for example approximately $10^{14}$ W.

The chirped pulse amplification technique therefore makes it possible to produce laser pulses with a very high instantaneous power.

In the devices typically used for chirped pulse laser amplification, the adjustment of the desired duration of the final amplified pulse is done by moving the components of the compressor, so as to modify the characteristics of the compression. More specifically, it is necessary to modify the angle of the diffraction gratings and their relative position.

For high-power lasers, the compressor 6 having to bear very high energy levels, the diffraction gratings making it up are large and must be placed in a vacuum chamber. Their handling to adjust the duration of the pulse or to adjust the time thereof, which requires modifications to the orientation of the gratings and the distances separating them, is therefore particularly awkward.

The precise adjustment of the duration of the final pulse is particularly problematic. In fact, this adjustment must be done as a function of experimental conditions, and may be modified over the course of an experiment or a series of experiments. To perform this adjustment without opening the vacuum chamber, certain chirped pulse amplification devices comprise diffraction gratings whereof the movements are motorized. This technical solution nevertheless creates significant costs.

Furthermore, the chirped pulse amplification devices generate time aberrations in the laser pulse, and in particular time phase residuals. These aberrations, which primarily appear in the shortest pulses (having a duration before stretching of less than 30 fs) having a greater spectral width, make it impossible to compress the pulse to the shortest duration that could theoretically be obtained.

In certain chirped pulse amplification devices, programmable systems for modifying the phase and amplitude may be installed to perform the time adjustment and correct the time aberrations of the pulse. These systems can only, however, withstand relatively low-energy pulses, and what is more, for some, create even more significant energy losses when the correction is significant. Moreover, the cost of these programmable phase and amplitude modification systems is very high.

AIMS OF THE INVENTION

The present invention aims to offset these drawbacks of the prior art.

In particular, the invention aims to provide a chirped pulse amplification device for laser pulses whereof the duration of the final pulse can be adjusted easily.

Another aim of the invention is to provide such a chirped pulse amplification device for laser pulses in which the time aberrations of the pulse can be corrected easily, so as to obtain very short-lasting amplified final pulses.

One particular aim of the invention is to provide such improvements to a chirped pulse amplification device at a lower cost, and without causing significant modifications to the device.

BRIEF DESCRIPTION OF THE INVENTION

These aims, as well as others that will appear more clearly hereafter, are achieved by a chirped pulse amplification device for a pulsed laser, consecutively comprising:

a stretcher capable of time-stretching an incident laser pulse;

at least one amplifying medium capable of amplifying the laser pulse;

a main compressor capable of time-compressing the laser pulse to the desired duration for the output pulse of the amplification device;

the amplification device comprising, according to the invention, at least one adjustment compressor, placed between the stretcher and the main compressor, wherein the laser pulse undergoes four diffractions on diffraction gratings, so as to time-compress the stretched laser pulse to a duration greater than the desired duration for the output pulse of the amplifying device.

Such an adjustment compressor can be adjusted to adjust the duration of the output pulse of the amplification device much more easily than the main compressor. Furthermore, it makes it possible to correct the time aberrations of the pulse. Lastly, adjustment compressor can be used in the amplifying device at a reduced cost, without significantly modifying the amplification devices of the prior art.

Advantageously, the compression rate of the adjustment compressor is less than 20% of the compression rate of the main compressor.

This low compression rate, which is preferably less than 10% of the compression rate of the main compressor, makes it possible to perform an effective adjustment of the duration of the output pulse of the amplification device, while nevertheless preserving the stretched pulse, whereof the low instantaneous power does not hinder the amplification in an amplifying medium.

Advantageously, the adjustment compressor is placed in a position where the energy from the laser pulse is less than 300 millijoules, and preferably less than 200 millijoules.

This position at the beginning of the amplification chain makes it possible to implement the adjustment compressor easily. In fact, this compressor is not subject, as the main compressor is, to excessive energy levels. It may therefore be made up of small gratings, placed in the open air.

Advantageously, the adjustment compressor is placed after the first amplification medium in an amplification chain formed by at least two amplification mediums.

This position after the first application medium makes it possible to perform the adjustment compression on a low-energy pulse, while limiting the energy loss of the pulse between its creation and its first amplification.

According to one possible embodiment of the invention, the adjustment compressor comprises four diffraction gratings on which the laser pulse is consecutively diffracted.

This construction of the adjustment compressor is similar to the traditional construction of the main compressor.

According to another possible embodiment of the invention, the adjustment compressor comprises two diffraction gratings and a fold-over dihedron imposing two diffractions on the laser pulse on each of the diffraction gratings.

This use of a fold-over dihedron, known in itself, makes it possible to reduce the size of the adjustment compressor, and makes adjustment easier. The number of components that must be moved to perform this adjustment is lower.

According to one advantageous feature of the invention, the adjustment compressor is placed in the open air, and the main compressor is placed in a vacuum chamber.

This arrangement, which is made possible by the low energy level passing through the adjustment compressor, makes it possible to facilitate the adjustment of that adjustment compressor.

According to one advantageous embodiment, the adjustment compressor comprises transmissive diffraction gratings.

The transmissive diffraction gratings, which are usable in the adjustment compressor due to the low energy level passing through it, may have better energy performance.

According to another advantageous embodiment, the adjustment compressor comprises reflective diffraction gratings.

Advantageously, the adjustment compressor comprises diffraction gratings having a pitch and an incidence angle that are identical to the diffraction gratings used in the main compressor.

The use of optically identical diffraction gratings in the main compressor and the adjustment compressor allows an easier adjustment of the pulse duration.

According to one alternative feature, the adjustment compressor comprises diffraction gratings having a different pitch and/or an incidence angle from the diffraction gratings used in the main compressor.

This use of different gratings makes it possible to have more adjustment parameters to correct the time aberrations of the pulse.

According to one particular embodiment of the invention, the amplification device includes at least two adjustment compressors, the diffraction gratings used in the different compressors having a different pitch and/or incidence angle.

This use of several different adjustment compressors makes it possible to have more adjustment parameters to correct the time aberrations of the pulse.

According to another particular embodiment of the invention, the amplification device also comprises a programmable phase and amplitude modification system, placed between the stretcher and the main compressor.

This use of an adjustment compressor associated with another known adjustment device makes it possible to have more adjustment parameters to correct the time aberrations of the pulse.

BRIEF DESCRIPTION OF DRAWING FIGURES

The present invention will be better understood upon reading the following description of preferred embodiments of the invention, used as illustrative and non-limiting examples, and accompanied by drawings, in which.

DETAILED DESCRIPTION OF THE INVENTION

Figure 2:
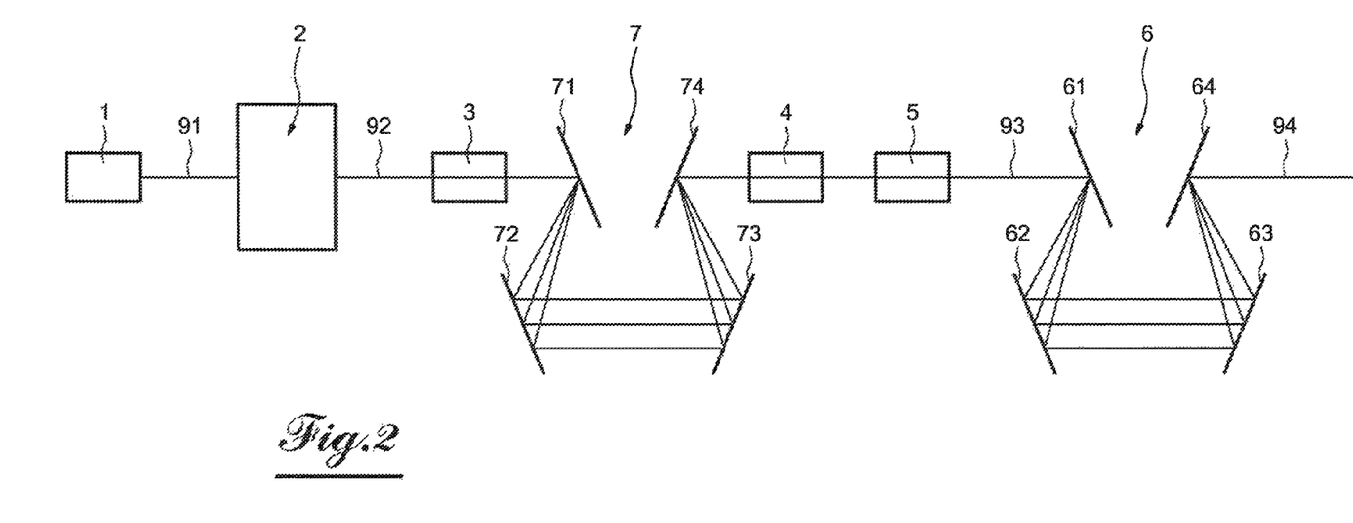
FIG. 2 is a simplified diagram of a chirped pulse amplification device for a laser pulse according to a first embodiment of the invention.

FIG. 2 diagrammatically shows a chirped pulse amplification device according to a first embodiment of the invention. The elements of this amplification device, as well as those of FIGS. 3 and 4, that are identical or similar to those of the prior art described in reference to FIG. 1 bear the same numerical references.

As in the prior art, an oscillator 1 emits an input laser pulse 91 that passes through a stretcher 2. The time-stretched pulse 92 leaving the stretcher 2 passes through an amplification chain comprising several amplifying mediums 3, 4 and 5.

The compressor 6, like the compressor of the prior art, includes four diffraction gratings 61, 62, 63 and 64 imposing different path lengths on the different spectral components of the pulse, causing a time shift as a function of their wavelength opposite to the shift generated by the stretcher 2.

According to the invention, an adjustment device 7 enabling a time adjustment of a final pulse 94 produced by the amplification device is inserted in said amplification device between the stretcher 2 and the compressor 6, within the amplification chain. In the illustrated example, the adjustment device 7 is placed in the amplification chain between a first amplifying medium 3 and the second amplifying medium 4.

This position in the amplifying chain allows the adjustment device 7 to undergo only a relatively low energy level, of approximately several tens of millijoules. Further, this position after the first amplifying medium 3 makes it possible to limit the energy losses occurring between the creation of the laser pulse in the oscillator 1 and its first amplification. This limitation of the losses makes it possible to limit the appearance of aberrations in the pulse.

According to the invention, the adjustment device 7 is formed by a compressor, hereafter called an adjustment compressor 7, implementing diffraction gratings, which may be similar to the compressor 6, hereafter called the main compressor, used for the final compression of the pulse.

Thus, according to the first embodiment of FIG. 2, the adjustment compressor 7 comprises four diffraction gratings 71, 72, 73 and 74 that act identically to the diffraction gratings 61, 62, 63 and 64, respectively, of the main compressor 6.

Thus, the grating 71 spectrally disperses the stretched pulse. The second grating 72 returns, in parallel, the spectral components making up the laser pulse, which are thus spatially spread out. The third grating 73 makes it possible to gather these different spectral components at a same point of the fourth grating 74, which returns all of the spectral components in a same direction, to form a new laser pulse.

The path length difference of the different spectral components causes a time shift of the spectral components as a function of their wavelength, opposing the spectral shift generated by the stretcher 2. The distances between the diffraction gratings 71, 72, 73 and 74, combined with the characteristics of those gratings, are nevertheless chosen so that the adjustment compressor 7 performs a much smaller compression than that done by the main compressor 6.

Thus, the compression rate of this adjustment compressor 7 is less than 20% of the compression rate of the main compressor 6, and preferably approximately 10% of that rate.

The adjustment compressor 7 thereby enables a small compression of the laser pulse, making it possible to reduce its duration only slightly. The compression function that, in the assembly of FIG. 1, is performed only by the main compressor 6 is then done, in the assembly according to the invention of FIG. 3, jointly by the adjustment compressor 7 and the main compressor 6.

The adjustment compressor 7 having a low compression rate, it does not affect the duration of the stretched pulse significantly enough for that pulse to have instantaneous power levels hindering the amplification of the pulse in the amplifying mediums 4 and 5.

The presence of the adjustment compressor 7 makes it possible to facilitate the time adjustment of the compressed pulse considerably.

In fact, the total compression level of the pulse being equal to the product of the compression rate of the adjustment compressor 7 and the main compressor 6, it is possible to adjust only that total compression rate by modifying the characteristics of the adjustment compressor 7.

Thus, it is not necessary to perform this adjustment by modifying the positions of the components of the main compressor 6, which, having to bear very high energy levels, are large and must be placed in a vacuum chamber.

On the contrary, the adjustment compressor 7 only being subjected to a pulse with a low energy level, it may be made up of small diffraction gratings situated in the open air. The adjustment of their orientation and the distance separating them can therefore be done extremely easily.

According to one particular embodiment of the invention, it is also possible for the adjustment compressor 7 to implement transmissive gratings, instead of reflective diffraction gratings typically used for the main compressor 6. The use of transmissive gratings, made possible by the low energy level of the pulse passing through the adjustment device, makes it possible to improve the energy efficiency of the adjustment compressor.

Advantageously, in particular to amplify pulses with an initial duration longer than 30 fs, the adjustment compressor 7 can implement gratings having the same characteristics (incidence angle and pitch, corresponding to the number of lines) as the gratings making up the main compressor 6. This embodiment makes it easier to determine the adjustment parameters of the final pulse duration. In fact, under these conditions, a movement of the gratings making up the adjustment compressor has the same optical effects on the final pulse 94 as a movement with the same distance of the gratings of the main compressor 6.

For the shortest pulses, on the contrary, it may be advantageous to implement, in the adjustment compressor 7, diffraction gratings having different optical characteristics from those of the main compressor 6. It is thus possible to act on a larger number of parameters to correct the aberrations of the laser pulse.

Figure 3:
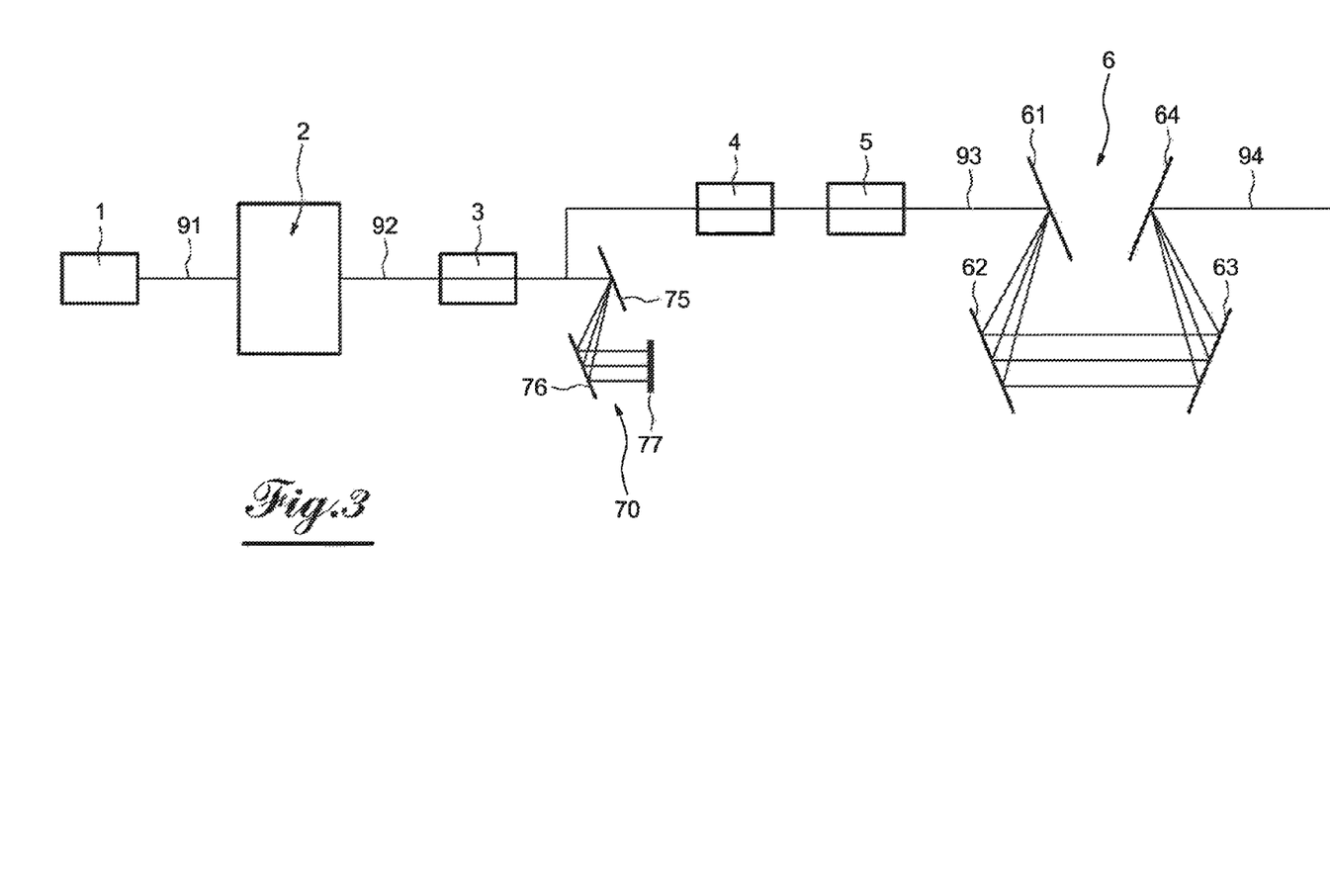
FIG. 3 is a simplified diagram of a chirped pulse amplification device of a laser pulse according to a second embodiment of the invention.

FIG. 3 shows another possible embodiment of the invention, in which the adjustment compressor 70 has a folded shape.

Thus, the subassemblies formed, in the adjustment compressor 7 of FIG. 2, on the one hand by the gratings 71 and 72, and on the other hand by the gratings 73 and 74, are folded traditionally in the adjustment compressor 70 of FIG. 3, using a fold-over dihedron 77, so that only one sub-assembly made up of the gratings 75 and 76 is traveled over twice by the laser pulse.

This embodiment, which is made possible by the low energy levels of the pulse traveling through the adjustment compressor 70, is easier to implement and creates lower manufacturing costs. The size of the adjustment compressor is thus reduced, and its adjustment facilitated. In fact, the number of components to be moved to perform this adjustment is lower. The optical characteristics of this adjustment compressor 70 are identical to those of the adjustment compressor 7.

The set of mirrors making it possible to return the pulse leaving the adjustment compressor 70 toward the amplifying mediums 4 and 5 are not shown in FIG. 3.

Figure 4:
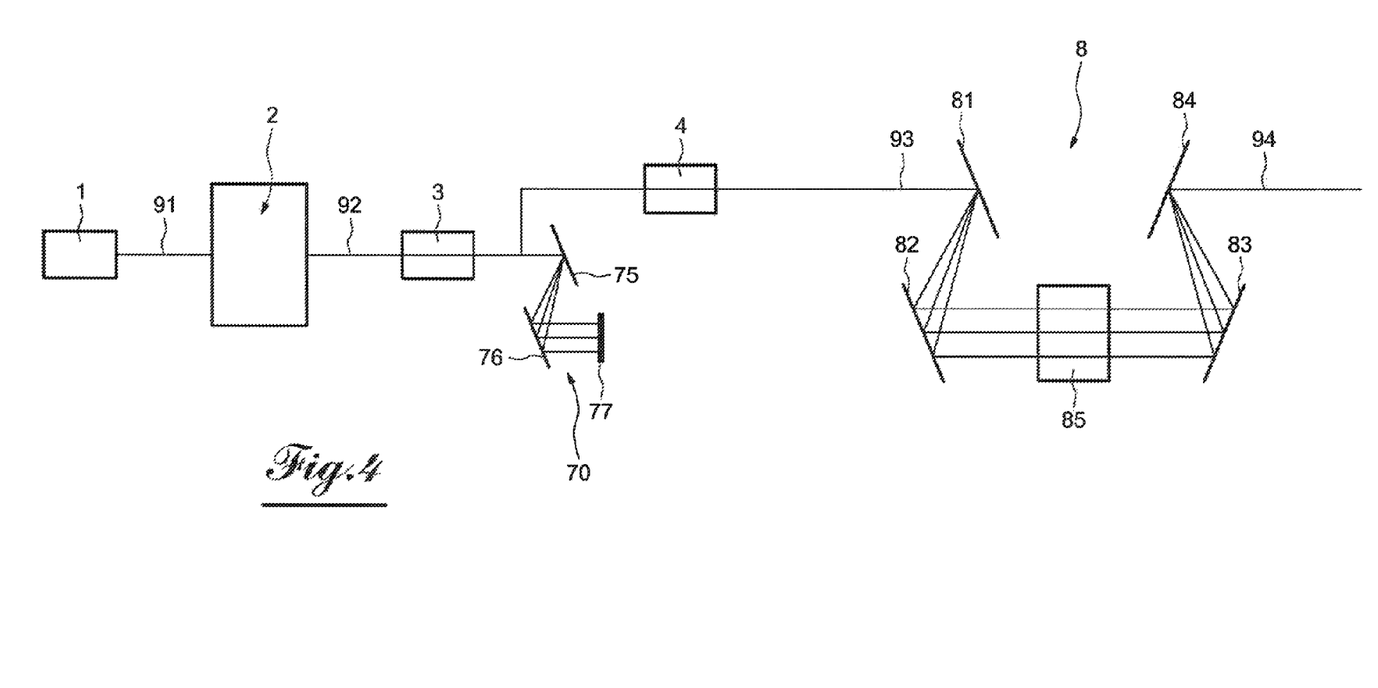
FIG. 4 is a simplified diagram of a chirped pulse amplification device for a laser pulse according to a third embodiment of the invention.

FIG. 4 diagrammatically shows one particular embodiment of the invention in which the main compressor 8 comprises an amplifying medium 85. This particular embodiment of the main compressor 8 does not modify the mode of action of the adjustment compressor 7 or the advantages it procures.

Other alternatives of the invention may easily be implemented by those skilled in the art.

It may in particular be advantageous, to make the time adjustment of the pulse and the attenuation of time aberrations easier and more effective, to jointly use an adjustment compressor according to the invention and another known adjustment device, for example such as a programmable phase and amplitude modification system of the pulse. These two systems can then be placed one behind the other in the amplification chain, their effects advantageously being combined.

It is also possible to place the adjustment compressor before the first amplifying medium of the structure. Such an embodiment would, however, have the drawback of greatly reducing the energy of the pulse before the first amplification thereof, which may create aberrations in the pulse.

It is also possible to place the adjustment compressor in any other position of the amplification chain. The interest of such embodiments is, however, low, the implementation of the adjustment compressor becoming difficult for beams having very strong energy, having a width greater than approximately 2 cm, which corresponds to approximately 200 millijoules. The adjustment compressor is therefore preferably placed in a position of the amplification chain where the energy of the pulse is below 300 millijoules, and preferably below 200 millijoules.

According to one particular embodiment of the invention, several adjustment compressors can be provided in the amplification chain. This embodiment may in particular make it possible, by using diffraction gratings having different characteristics in the different gratings, to have a larger number of adjustment parameters of the output pulse of the chirped pulse amplification device.

It may also be possible, according to one particular embodiment, to implement an adjustment compressor comprising a single diffraction grating, a mirror set making it possible for the laser pulse to undergo four diffractions on that grating. Such an adjustment compressor would optically be similar to the adjustment compressors shown in FIGS. 2 to 4.

The invention claimed is:

1. A chirped pulse amplification device amplifying a laser pulse of laser light comprising:
   a stretcher time-stretching laser pulse incident on the stretcher and producing a stretched laser pulse;
   two serially arranged amplifying media amplifying the stretched laser pulse and producing an amplified stretched laser pulse;
   a main compressor time-compressing the amplified stretched laser pulse and producing an output laser pulse of the amplification device, the output laser pulse having a desired duration; and
   a first adjustment compressor adjusting duration of the stretched laser pulse to a duration longer than the desired duration of the output laser pulse and correcting time aberrations of the stretched laser pulse, wherein
   the first adjustment compressor is located between the stretcher and the main compressor and between the two amplifying media, and the first adjustment compressor includes at least two movable diffraction gratings that are movable into positions correcting the time aberrations of the stretched laser pulse.

2. The amplification device according to claim 1, wherein the main compressor and the first adjustment compressor have respective compression rates and the compression rate of the first adjustment compressor is less than 20% of the compression rate of the main compressor.

3. The amplification device according to claim 1, wherein the first adjustment compressor is located at a position where energy of the stretched laser pulse is less than 300 millijoules.

4. The amplification device according to claim 1, wherein the first adjustment compressor comprises four diffraction gratings and the stretched laser pulse is consecutively diffracted from each of the four diffraction gratings.

5. The amplification device according to claim 1, wherein the first adjustment compressor comprises first and second diffraction gratings and a fold-over dihedron causing two diffractions of the stretched laser pulse from each of the first and second diffraction gratings.

6. The amplification device according to claim 1, wherein the first adjustment compressor is located in air, and the main compressor is located in a vacuum.

7. The amplification device according to claim 1, wherein the first adjustment compressor comprises two transmissive diffraction gratings.

8. The amplification device according to claim 1, wherein the first adjustment compressor comprises two reflective diffraction gratings.

9. The amplification device according to claim 1 wherein the main compressor includes two diffraction gratings having a pitch and an incidence angle and the first adjustment compressor comprises two diffraction gratings having a pitch and an incidence angle that are identical to the pitch and incidence angle of the two diffraction gratings of the main compressor.

10. The amplification device according to claim 1, wherein the main compressor includes two diffraction gratings having a pitch and an incidence angle and the first adjustment compressor comprises two diffraction gratings having a pitch and/or an incidence angle different from the pitch and/or incidence angle of the two diffraction gratings of the main compressor.

11. The amplification device according to claim 1, including a second adjustment compressor, wherein
the first and second adjustment compressors include respective diffraction gratings, and
the diffraction gratings in the first adjustment compressor have a different pitch and/or incidence angle from the diffraction gratings in the second adjustment compressor.

12. The amplification device according to claim 1, comprising a programmable phase and amplitude modification system, located between the stretcher and the main compressor.

* * * * *